United States Patent [19]

Bailey

[11] Patent Number: 4,893,864
[45] Date of Patent: Jan. 16, 1990

[54] EXTENSIBLE AND RETRACTABLE COVER APPARATUS

[76] Inventor: Barbara Bailey, 329 Slagle Rd., Leesville, La. 71446

[21] Appl. No.: 279,492

[22] Filed: Dec. 5, 1988

[51] Int. Cl.$^4$ ................................................ B60P 7/02
[52] U.S. Cl. ..................................................... 296/98
[58] Field of Search ................................. 296/98, 100

[56] References Cited

U.S. PATENT DOCUMENTS

| | | | |
|---|---|---|---|
| 3,549,198 | 12/1970 | Cappello | 296/100 |
| 3,549,199 | 12/1970 | Sibley | 296/100 |
| 3,854,770 | 12/1974 | Grise et al. | 296/98 |
| 4,516,802 | 5/1985 | Compton | 296/98 |

Primary Examiner—Robert R. Song
Attorney, Agent, or Firm—Leon Gilden

[57] ABSTRACT

A truck bed cover apparatus biased between a retracted and extended to cover a cargo portion of a truck apparatus. A winch means is operative in cooperation with a guide surface to smoothly retract the cover by means of the guide surface to minimize wear and abrasion normally imposed on such cover apparatus.

1 Claim, 1 Drawing Sheet

U.S. Patent  Jan. 16, 1990  4,893,864
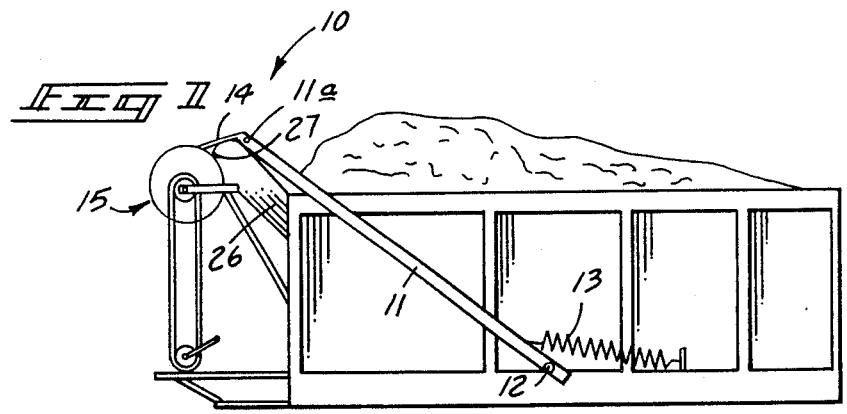
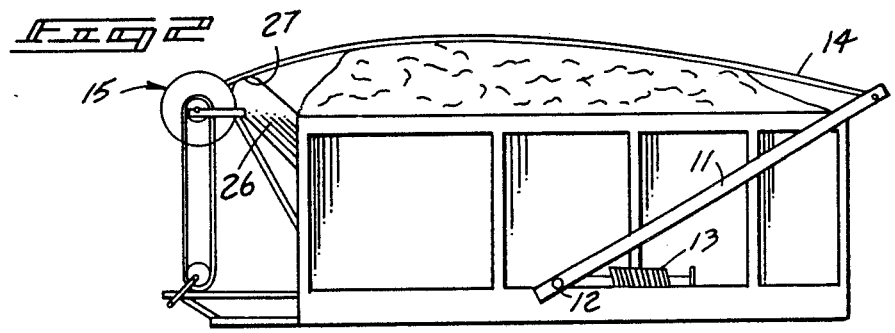
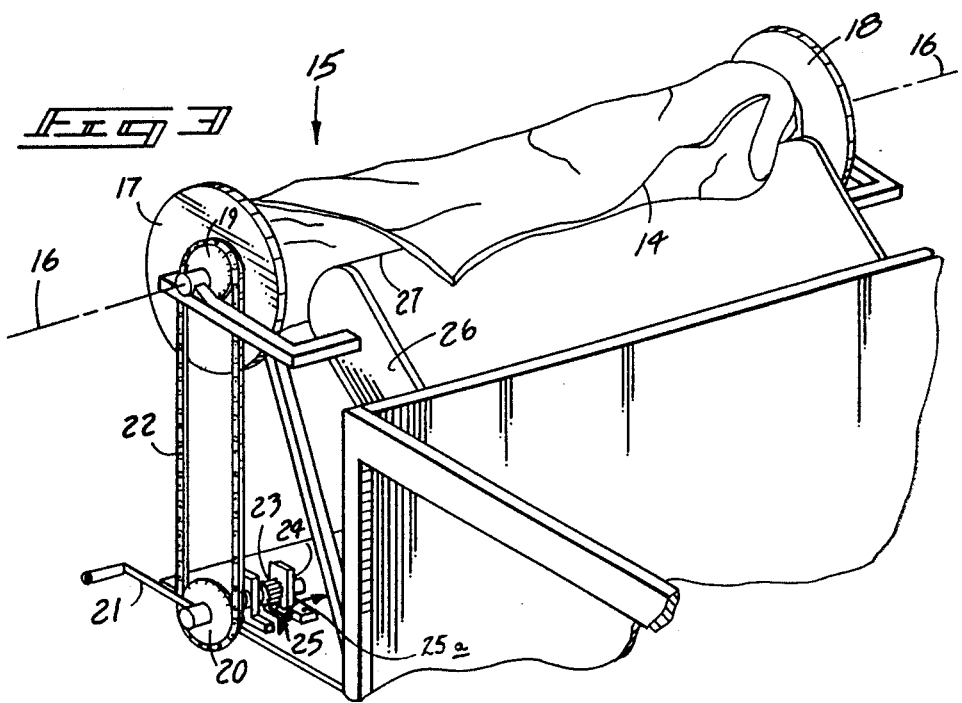

EXTENSIBLE AND RETRACTABLE COVER APPARATUS

BACKGROUND OF THE INVENTION

1. Field of the Invention

The present invention relates to truck bed cover apparatus, and more particularly pertains to a new and improved extensible and retractable cover apparatus which is normally biased to cover a truck bed and is effective to smoothly retract the truck cover by means of a guide surface for efficient storage of same.

2. Description of the Prior Art

The use of truck cover apparatus is well known in the prior art. As may be appreciated, these devices have normally been associated with bulky and awkward retracting and extending devices which attempt to store truck covers in a variety of fashions, all of which tend to prematurely wear out covering material, generally of a fabric-like construction. In this connection, there have been several attempts to develop truck cover apparatus that may efficiently extend and retract covering material. For example, U.S. Pat. No. 4,067,603 to Fenton presents a covering assembly for a truck body including an elongate skeleton structure overlying the open cavity of said truck body with an associated cable and pulley structure to direct a foldable according pleated covering over said truck bodies. The elaborate structure required limits access to a truck body interior and a complex orientation of pulleys and cables renders this organization somewhat less desirable in many applications. Furthermore, the gathered up covering when secured in its retractable position tends to collect dirt and moisture as well as tend to buffet during driving due to wind and effecting accelerated wear and tear of said covering material.

U.S. Pat. No. 4,095,840 to Woodard illustrates an improvement in the field of truck coverings wherein an elongate pair of boom elements covers a truck body upon release of tension to support cables by means of spring tension. When retraction of said covering material is desired, a winch-like arrangement gathers up the cables and accordingly gathers up the covering material. The thusly gathered covering material suffers the same deficiencies as in the Fenton patent in that this type of according-like gathering develops a series of parallel pouches for the containment of moisture and dirt and erosion of covering fabric is greatly accelerated particularly when a vehicle is driven with the fabric so gathered whereby the buffeting action of wind upon such covering material understandably has to prematurely disintegrate the structural integrity of such fabric-like structures.

U.S. Pat. No. 4,126,351 to Peteretti sets forth an extensible cover for an open body of a truck including a medially located pleat structure for expansion of such covering material. The Peteretti patent illustrates a rolling arrangement for the covering fabric and while an improvement over the prior art approaches, the patent fails to present a guide surface for rendering the gathering of such fabric material to proceed smoothly to thereby insure that the gathering and ungathering of such material may cycle for an extended time frame and thusly avoid thereby improper furling of such material.

U.S. Pat. No. 4,129,331 to Lawson sets forth a flexible cover closing apparatus whereupon a flexible cover material is pneumatically driven to cover an open truck body laterally of said body, again including the prior art shortcomings of gathering such fabric in an accordion-like fashion.

U.S. Pat. No. 4,215,897, to Aiken et al. presents a cable-driven means of enclosing a cargo body by drawing runners therealong with fabric-like material gathered between said runners. This approach is unfortunately similar to the previous attempts to cover truck bodies and in addition to the awkward gathering of fabric material and use of runners to gather fabric therebetween, a bulky cable run structure is required presenting a somewhat complicated organization that must be carefully guarded to avoid damage thereto. U.S. Pat. No. 4,285,539 to Cole illustrates a further covering-like material gathered over a skeleton structure whereby the skeletonized organization is motivated to extend and retract along an elaborate guide rail structure. As in other prior applications, the use of such organizations greatly limits access to truck body interiors.

U.S. Pat. No. 4,583,777 to Myburgh is merely another in a series of retractable covering systems for a truck body utilizing elaborate readily positioned cable organizations and associated skeleton structure to guide and maintain a cover in position over a truck body.

As such it may appreciated that there exists a continuing need for a new and improved truck body cover which addresses both the problems of maintaining cover longevity as well as providing an effective and efficient means of quickly covering and uncovering a truck body. In this respect, the present invention substantially fulfills this need.

SUMMARY OF THE INVENTION

In view of the foregoing disadvantages inherent in the known types of truck bed covers now present in the prior art, the present invention provides an truck bed cover including a controlled furling and unfurling arrangement positioned in cooperative relationship with a curvilinear guide structure maintaining the extension or retraction of the truck cover presented over the truck body in a smooth, unwrinkled, uniform manner. As such, the general purpose of the present invention, which will be described subsequently in greater detail, is to provide a new and improved truck bed cover which has all the advantages of the prior art truck bed covers and none of the disadvantages.

To attain this, the present invention sets forth an extensible and retractable truck bed cover utilizing biased, parallel arms to extend the truck body covering material over the extent of an open truck bed including a windlass arrangement including a gear reduction sprocket assembly to furl and unfurl covering material.

My invention resides not in any one of these features per se, but rather in the particular combination of all of them herein disclosed and claimed and it is distinguished from the prior art in this particular combination of all of its structures for the functions specified.

There has thus been outline, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is of enable the U.S. Patent and Trademark Office and the public generally, and especially the scientists, engineers and practitioners in the art who are not familiar with patent or legal terms of phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved truck bed cover apparatus which has all the advantages of the prior art truck cover apparatus and none of the disadvantages.

It is another object of the present invention to provide a new and improved truck bed cover which may be easily and efficiently manufactured and marketed.

It is a further object of the present invention to provide a new and improved truck bed cover which is of a durable and reliable construction.

An even further object of the present invention is to provide a new and improved truck bed cover which is susceptible of a low cost of manufacture with regard to both materials and labor, and which accordingly is then susceptible of low prices of sale to the consuming public, thereby making such truck bed covers economically available to the buying public.

Still yet another object of the present invention is to provide a new and improved truck bed cover which provides in the apparatuses and methods of the prior art some of the advantages thereof, while simultaneously overcoming some of the disadvantages normally associated therewith.

Still another object of the present invention is to provide a new and improved truck bed cover including a gear reduction arrangement enabling furling and unfurling of said covering material.

Yet another object of the present invention is to provide a new and improved truck bed cover including a curvilinear guide member extending parallel and axially to said furling drum to insure smooth, wrinkle free and long lasting use of covering material.

Even still another object of the present invention is to provide a new and improved truck bed cover including parallel arms to extend covering material over a truck bed cover wherein said arms are normally biased to extend said material.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a side orthographic view of the present invention illustrating the fabric material in a retracted position relative to said truck body.

FIG. 2 is a side orthographic view of the present invention illustrating the covering material in an extended position relative to said truck body.

FIG. 3 is an isometric illustration of the present invention setting forth a more detailed illustration of the furling and unfurling drum and its orientation to an adjacent guide structure.

DESCRIPTION OF THE PREFERRED EMBODIMENT

With reference now to the drawings, and in particular to FIG. 1 thereof, a new and improved truck bed cover embodying the principles and concepts of the present invention and generally designated by the reference numeral 10 will be described.

More specifically, it will be noted that pivoting arms 11 are secured to a truck body by means of a pivot axle 12. A spring element 13 biases each pivoting arms 11 to a normally extended covering position, as illustrated in FIG. 2. It should be noted that pivoting arm 11, pivot axle 12 and spring 13 are duplicated on the other side of the noted truck body and are mere duplicates of the illustrated elements 11, 12, and 13 and are mounted in a parallel orientation at the other side of said body relative to the aforenoted elements.

Covering material 14 is secured to aforenoted parallel pivoting arm 11 at terminal portion 11a. A drum assembly 15 is positioned to furl and unfurl said covering material 14. Said drum assembly is comprised of a central core formed about an axis 16 defined by a right drum flange 17 and a left drum flange 18. Said drum assembly 15 is reeled in or furled to secure cover material 14 thereabout by means of a motivating mechanism including an upper sprocket 19 coaxially secured to said drum assembly about axis 16 in cooperating relationship with a lower sprocket 20 driven by a manually manipulatable handle means 21 which by way of a chain 22 is utilized to furl said covering material about said drum assembly. It may be appreciated that lower sprocket 20 may be driven by any equivalent mechanism such as a high torque electric motor, for example.

Coaxially aligned in relation to lower sprocket 20 is a detent sprocket 23 with a pivotal latch mechanism 24 positionable in the direction indication by arrow 25 about pivot 25a to either maintain positioning of drum assembly as it is furled or else release a drum assembly 15 by pivoting latch element 24 in a direction indicated by arrow 25 enabling said drum assembly to unfurl said cover material 14 through action of pivoting arms 11 operative through springs 13 to cover a truck bed, as illustrated in FIG. 2.

A guide member 26 is oriented and arrayed positioned relative to drum assembly 15 and is furthermore provided with a contact surface 27 coaxially aligned with axis 16 to frictionally engage in a tangential manner curvilinear contact surface 27 the covering material 14 as it be furled or unfurled into respective position, as illustrated in FIGS. 1 and 2. Contact surface 27 and its frictional surface contact with covering material 14 maintains said material in an unwrinkled noninterfolded state to securely enable said material to smoothly furl or roll itself about drum assembly 15 and thereafter unroll itself as the need arises. Greatly extended service life and thereby useful application of covering material 14, as set forth, is resultant from use of guide number 26 in relation to drum assembly 15, as disclosed.

As to the manner of usage and operation of the present invention, the same should be apparent from the above description. Accordingly no further discussion relative to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A truck bed covering apparatus for use in combination with a truck bed assembly including an open truck bed formed of four side walls and a bottom wall wherein said truck bed covering apparatus comprises,
    a pair of parallel pivoting arm means each of said pair pivotally secured relative to said truck bed proximate one terminal end of said arm means and secured to flexible covering material proximate the other terminal end of each of said arm means, and
    said covering material being of finite length defined by two ends wherein one end is secured to said interconnecting element and a second end is secured to a drum assembly means, and
    said drum assembly means is secured by use of support rods to said truck bed and positioned proximate an upper side wall, and
    said drum assembly means is positioned and formed for furling and unfurling said covering material about a central axis, and
    said parallel pivoting arm means is pivotal from a first position enabling furling of said covering material and to a second position effecting unfurling of said drum assembly means, and
    spring means mounted to each of said pair of pivoting arm means for normally biasing each of said pair of pivoting arm means to said second position, and
    motive means enabling furling of said covering material, and
    said motive means including a first sprocket coaxially aligned with said drum assembly means, and a second sprocket spaced from and underlying the first sprocket including a continuous chain member operative associating the first and second sprocket, and a manually manipulatable handle axially secured to and projecting outwardly of the second sprocket to enable retraction of the flexible covering material to the first position, and a detent sprocket coaxially aligned and operatively associated with said second sprocket to maintain the second sprocket to maintain the second sprocket in a selected position, and
    further including a curvilinear contact surface member remote from said drum assembly positioned between said central axis and said truck bed for maintaining said cover materials in a wrinkle-free condition during furling and unfurling thereof by the drum assembly means.

* * * * *